United States Patent
Chiu

(10) Patent No.: US 7,676,821 B2
(45) Date of Patent: *Mar. 9, 2010

(54) METHOD AND RELATED SYSTEM FOR DETECTING ADVERTISING SECTIONS OF VIDEO SIGNAL BY INTEGRATING RESULTS BASED ON DIFFERENT DETECTING RULES

(75) Inventor: Andy Chiu, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 916 days.

This patent is subject to a terminal disclaimer.

(21) Appl. No.: 10/904,026

(22) Filed: Oct. 19, 2004

(65) Prior Publication Data

US 2005/0289583 A1   Dec. 29, 2005

(30) Foreign Application Priority Data

Jun. 24, 2004   (TW) .............................. 93118385 A

(51) Int. Cl.
*H04N 7/16* (2006.01)
*H04H 20/14* (2008.01)
*H04H 60/29* (2008.01)

(52) U.S. Cl. ................... 725/22; 348/700; 348/701; 348/702; 375/240.25; 386/1; 386/46

(58) Field of Classification Search ................ 725/22; 348/700–702; 358/908; 386/1, 46
See application file for complete search history.

(56) References Cited

U.S. PATENT DOCUMENTS 6,157,744 A * 12/2000 Nagasaka et al. ........... 382/236
2002/0054242 A1 * 5/2002 Suito et al. .................. 348/700

* cited by examiner

*Primary Examiner*—Scott Beliveau
*Assistant Examiner*—Kunal Langhnoja
(74) *Attorney, Agent, or Firm*—Winston Hsu

(57) ABSTRACT

Method and related system for detecting advertising sections of video signal. The invention is capable of integrating detecting results based on different detecting rules, which includes detecting discontinuity of frame images in the video signals, detecting occurrences of frames with specific images, detecting occurrences of repeated frames, and detecting audio divisions in the video signal. Detecting results of these detecting rules are integrated by weighting them according to their accuracy, such that occurrence of advertising can be located.

20 Claims, 11 Drawing Sheets

US 7,676,821 B2

METHOD AND RELATED SYSTEM FOR DETECTING ADVERTISING SECTIONS OF VIDEO SIGNAL BY INTEGRATING RESULTS BASED ON DIFFERENT DETECTING RULES

BACKGROUND OF INVENTION

1. Field of the Invention

The invention relates to a method and a related system for detecting advertising sections of a video signal, and more particularly, to a method and a related system for detecting advertising sections by integrating different detecting rules.

2. Description of the Prior Art

Video programs provided by wired or wireless broadcasting and TV media have become an important information source in modern information society. The viewers can get useful news, knowledge, information, and entertainment from the aforementioned TV programs. However, out of business considerations, video programs often have advertising sections between normal programs. For viewers, these advertising sections interfere with normal programming and annoy viewers. When viewers want to record these programs for future viewing, these advertising sections cost a lot of the viewer's resources (for example, DVD discs or video tapes). Therefore, the advertising sections require users to inconveniently search through the recorded video signal. In the prior art, it is difficult to detect advertising sections of video signals.

SUMMARY OF INVENTION

It is therefore a primary objective of the claimed invention to provide a method and related system for detecting advertising sections to allow users to filter out or ignore these advertising sections of video signals so that users can utilize video programs provided by broadcasting and TV media more efficiently, to solve the above-mentioned problem.

According to an exemplary embodiment of the claimed invention, a method for detecting advertising sections of a video signal is disclosed. The method comprises: obtaining the video signal, wherein the video signal is capable of providing a plurality of frames according to a predetermined order to show a dynamic image; performing a difference comparing step to determine the difference between the frames of the video signal, wherein if a difference between a frame and a successive frame is more than a threshold difference, corresponding difference information is provided according to the frame; performing a similarity comparing step to determine a similarity between the frames of the video signal and a reference frame, wherein if the similarity between a frame and the reference frame is more than a threshold similarity, corresponding similarity information is provided according to the frame; and performing an advertising estimating step to determine which frames of the video signal belong to the advertising sections according to the difference information and the similarity information.

Furthermore, a signal processing system capable of detecting advertising sections of a video signal is disclosed. The signal processing system comprises: a frame buffering module for temporarily storing the video signal, wherein the video signal is capable of providing a plurality of different frames to show a dynamic image according to a predetermined order; a difference comparing module for determining a difference between each frame of the video signal, wherein if a difference between a frame and a successive frame is more than a threshold difference, the difference comparing module provides corresponding difference information according to the frame; a similarity comparing module for determining a similarity between each frame of the video signal and a reference frame, wherein if a similarity between a frame and the reference frame is more than a threshold similarity, the similarity comparing module is capable of providing corresponding similarity information according to the frame; and an advertising estimating module for determining which frames of the video signal belong to the advertising sections according to the difference information and the similarity information.

Generally speaking, when advertising sections are inserted into normal video programs, the advertising sections make normal programs have a discontinuity of frames and have a transition of audio signals. Furthermore, for helping viewers connect normal programs interrupted by the advertising sections, sections of normal programs are replayed after the advertising sections. In addition, a specific connection section (for example, an enterprise identification mark or a specific sentence) could be shown at a transition between the normal programs and the advertising sections. The present invention utilizes the above-mentioned characteristics to detect a possible inserted position of the advertising sections according to different detecting rules and to integrate detected results of different detecting rules. So an inserted position is determined.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
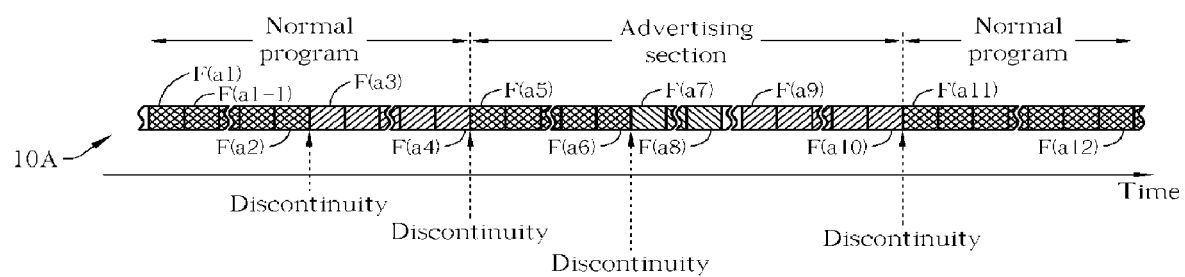
FIG. 1-FIG. 4 respectively illustrate different characteristics of the inserting position of the advertising section of the video signal.

Please refer to FIG. 1-FIG. 4, which illustrate that advertising sections are inserted in normal programs. First, as shown in FIG. 1, the video signal 10A can sequentially provide frames F(a1), F(a1+1) to F(a2), F(a3) to F(a4), and F(a11) to F(a12) and so on, and utilize the above-mentioned frames to show a dynamic image. Please note that frames F(a1) to F(a2) and F(a3) to F(a4) are used to show the dynamic image of a normal program Pa1, frames F(a11) to F(a12) are used to show the dynamic image of a normal program Pa2, and frames F(a5) to F(a6) and F(a7) to F(a10) are used to show the dynamic image of an advertising section.

As known by those skilled in the art, the same series of dynamic images (such as dynamic images of the same scene) can be shown by a series of frames, which have gradual changes. This is true even if the normal programs or advertising sections are composed of different series of dynamic images. Please refer to FIG. 1 again, the frames F(a1) to F(a2), F(a3) to F(a4), F(a5) to F(a6), F(a7) to F(a8), F(a9) to F(a10), and F(a11) to F(a12) are all used to show different series of dynamic images. For example, between the frame F(a1) and the frame F(a2), the frame F(a1) and the next frame F(a1+1) are similar and gradually changed (in other words, they have only few differences), the frame F(a1+1) and the next frame are also similar and gradually changed. Therefore, the frames F(a1) and F(a2) can be used to show a smoothly changed dynamic image. In contrast to similarities between frames corresponding to the same series, frames corresponding to different series have more differences between them so that the discontinuity of frames occurs. For example, as shown in FIG. 1, the frames F(a1) to F(a2) and F(a3) to F(a4) are respectively used to show different series of dynamic images, therefore, the successive frames F(a2) and F(a3) have discontinuity of images. In addition, in contrast to the normal programs Pa1 and Pa2, the advertising sections Ad1 are shown by different series of dynamic images. Therefore, the advertising sections Ad1 and the normal programs Pa1 and Pa2 also have discontinuities of images. For example, between successive frames F(a4) and F(a5), and between successive frames F(a10) and F(a11), a discontinuity of images occur because of transitions between the advertising sections and the normal programs. In other words, a discontinuity of images must occur in the transition between the advertising sections and the normal programs.

Figure 2:
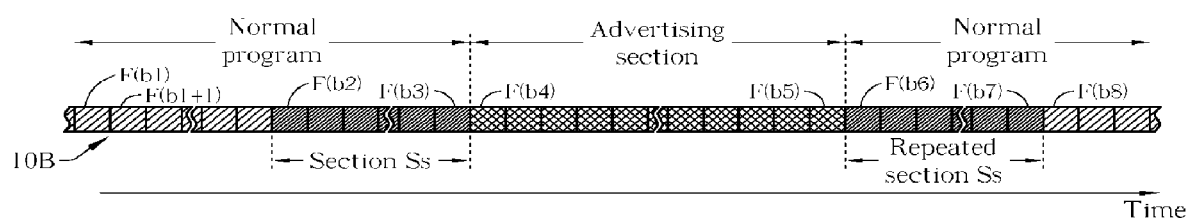

In FIG. 2, the video signal 10B can sequentially provide frames F(b1), F(b1+1) to F(b8) to show a dynamic image where F(b1) to F(b3) belong to a normal program Pb1, frames F(b6) to F(b8) are used to show a dynamic image of another normal program Pb2, and frames F(b4) to F(b5) are used to show an advertising section Ad2 between the normal programs Pb1 and Pb2. For allowing viewers to easily connect the content of normal programs, sections of normal programs, which are played just before the advertising section, are replayed after the advertising section. For example, as shown in FIG. 2, the normal program Pb2 has the replayed area Ss of the normal program Pb1; in other words, image of frames F(b2) to F(b3) is the same as the image of F(b6) to F(b7). Therefore, as mentioned above, it can be known that the same frames are played both before the advertising section and after the advertising section.

Figure 3:
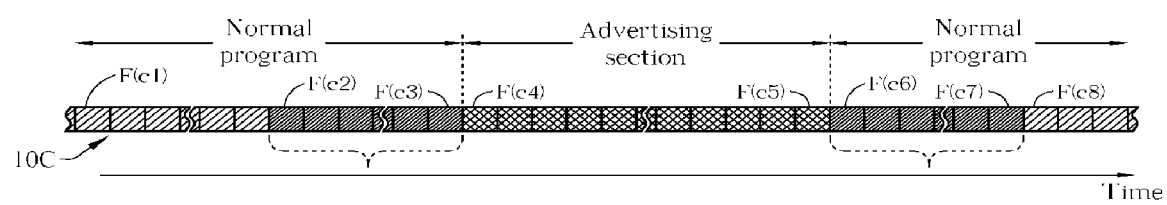

As shown in FIG. 3, the video signal 10C utilizes frames F(c1) to F(c8) to show the dynamic image, where the normal program Pc1 comprises frames F(c1) to F(c3), another normal program Pc2 comprises F(c6) to F(c8), and an advertising section Ad3 between the normal programs Pc1 and Pc2 comprises F(c4) to F(c5). For marking the beginning and the end of the advertising section, a specific connection section is often used to connect the normal programs and the advertising sections. For example, as shown in FIG. 3, frames F(c2) to F(c3) of the normal program Pc1 are a connection section, which can be an image or picture of a sentence (for example, "Take a Break"), in order to remind viewers of the advertising section Ad3 and an interruption of the normal program. Furthermore, after the advertising section Ad3, frames F(c6) to F(c7) can also be another connection section (such as "Program Part 2 Begins" or the enterprise identification mark of the media) to remind viewers of the end of the advertising sections. The above-mentioned connection sections, which are shown before or after the advertising sections, have a specific content. Therefore, the appearance of the specific content shows when the advertising sections begin or end.

Figure 4:
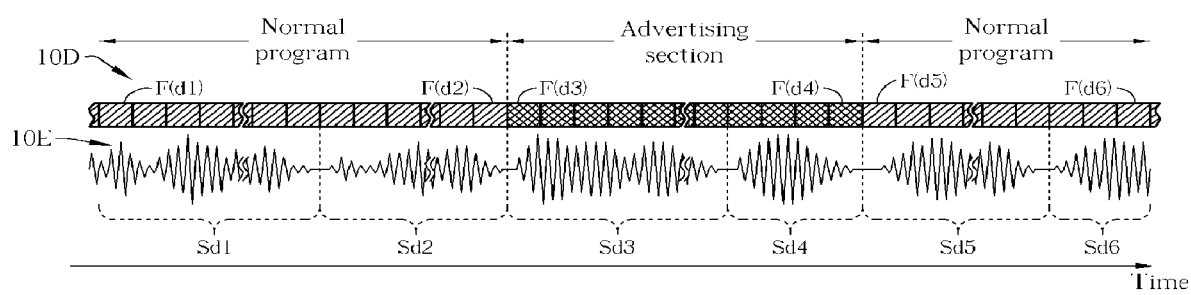

As known by those skilled in the art, besides frames of images, the video signal also have corresponding audio signals to show dynamic images with sounds. As shown in FIG. 4, the audio signal 10E corresponds to the video signal 10D; when the video signal sequentially provides frames F(d1) to F(d2), F(d3) to F(d4), F(d5), and so on to respectively show dynamic images of a normal program Pd1, an advertising section Ad4, and a normal program Pd2, the audio signal 10E simultaneously provides corresponding audio information (for example, audio frequencies or audio amplitudes) to show the effect of video multimedia. As known by those skilled in the art, the audio signal 10E comprises different audio sections. For example, in FIG. 4, in normal programs Pd1 and Pd2, the audio signal 10E can respectively provide audio sections Sd1 and Sd2, Sd5 and Sd6 to represent corresponding audio signals. The above-mentioned audio sections can be used to represent different music or different dialogues of actors. Similarly, the advertising section Ad4 also has audio sections Sd3, Sd4 corresponding to frames F(d3) to F(d4) to show the music and dialogues of the advertising section. The advertising section is inserted between normal programs at a certain timing (for example, the story or content of the normal programs finishes a section); as a section of the normal programs finishes, a section of the audio signal also finishes. In other words, the transition between the normal program and the advertising sections is also the transition of different audio sections.

From FIG. 1 to FIG. 4, we know that the inserting position of the advertising section has the following characteristics: first, a discontinuity is formed at the inserting position of the advertising section, second, a replayed section is shown before and after the advertising section, third, a specific connection section is shown before and after the advertising section, and fourth, the audio sections at the starting and end of the advertising section can be used as indications. In other words, if the discontinuity of the video signal can be automatically detected, the repeated section can be detected, the connection section can be detected, or the audio section can be detected, it is possible to detect where the advertising section is and to help users ignore or edit the advertising section.

Besides, since the discontinuity is not definitely caused by the advertising section, integrating different characteristics to generate the detected results can be another solution for facilitate the accuracy of determining the inserting position of the advertising section. For example, if a discontinuity between a frame and another frame prior to the frame is detected, and the frame conforms to the characteristic of the connection section, this means that the position between the frame and another frame prior to the frame has a high possibility to be the inserting position of the advertising section (for example, the end of the advertising section). The present invention substantially integrates the detected results of a fixed amount in order to detect the inserting position of the advertising section more accurately.

Figure 5:
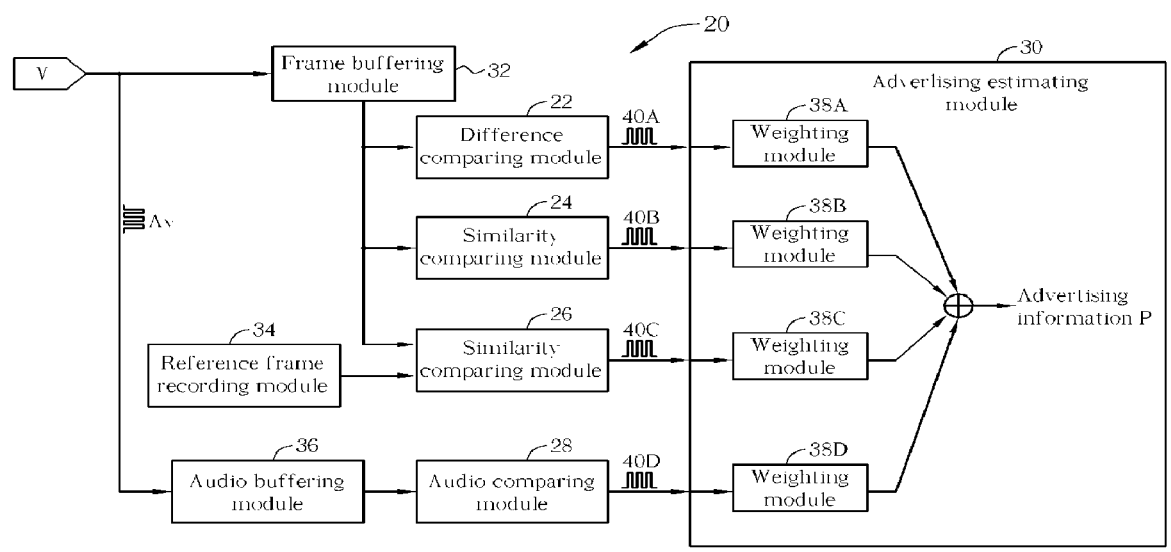
FIG. 5 is a block diagram of a signal processing system of an embodiment according to the present invention.

Please refer to FIG. 5, which is a block diagram of a signal processing system 20 of an embodiment according to the present invention. The signal processing system 20 can be built in a recording device (such as a video recorder using a video tape, an optical disk, or a hard disk) or a multimedia computer capable of recording/playing video signals to detect the advertising sections from the video signals. The signal processing module 20 can comprises a frame buffering module 32, an audio buffering module 36, a difference comparing module 22, similarity comparing module 24 and 26, a reference frame recording module 34, an audio comparing module 28, and an advertising estimating module 30. When the signal processing module 20 has to perform an adverting detecting operation on a video signal V, the frame buffering module 32 can obtain information of each frame from the video signal V and provide each frame to the difference comparing module 22 and the similarity comparing module 24 and 26. The audio buffering module 36 can receive the audio signal Av from the video signal V and provide the audio signal Av to the audio comparing module 28.

In the signal processing module 20, the difference comparing module 22, the similarity comparing module 24 and 26, and the audio comparing module 28 respectively detect the adverting section according to the characteristics shown in FIG. 1 to FIG. 4 and generate corresponding detected results 40A to 40D. For further illustrating operations of the aforementioned modules, please refer to FIG. 6 to FIG. 9 (in conjunction with FIG. 5).

Figure 6:
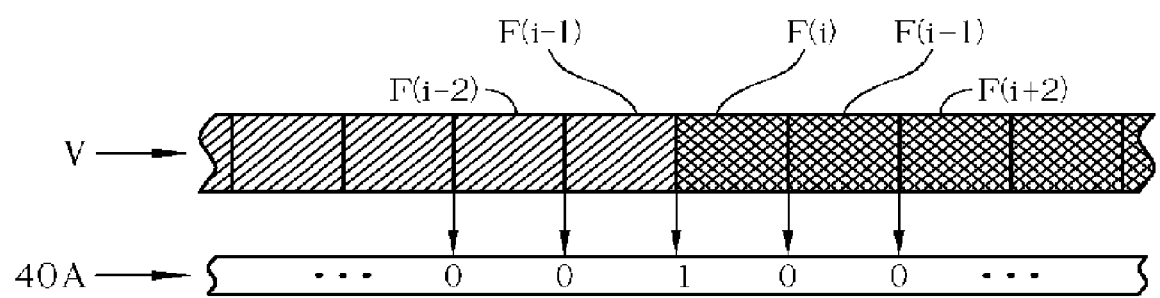
FIG. 6 to FIG. 9 are diagrams of corresponding data signals when each comparing circuits shown in FIG. 5 operates.

First, as shown in FIG. 6, according to a series of frames F(i−2), F(i−1), F(i), F(i+1), and F(i+2) of the video signal V, the difference comparing module 22 can sequentially compare two successive frames F(i−2) and F(i−1), F(i−1) and F(i), F(i) and F(i+1), and F(i+1) and F(i+2), determine differences between the two successive frames, and store the compared results in the detected result 40A. In the preferred embodiment, the characteristic data of a frame can be a sum of pixel information (such as luminance or chrominance information) of all pixels in the frame, a distribution of all pixel information (such as a distribution of information or chrominance, histogram) in the frame, or a frequency-domain transformation result corresponding to the frame (such as a two dimensional cosine transformation). The difference comparing module 22 can perform a comparing operation on the corresponding characteristic data of the two successive frames. If a difference between a frame and its successive frame is more than a threshold difference, the difference comparing module 22 can determine that a discontinuity between the frame and its successive frame occurs. In the embodiment of FIG. 6, a simple flag "0", "1" is used to show the difference comparing result between two successive frames in the detected result 40A.

For example, if the difference between the frame F(i−2) and the frame F(i−1) is not more than the threshold difference, this represents that the two frames belong to the same series of images and no discontinuity between them occurs. Therefore, the value of flags are "0" in the detected result 40A between the frame F(i) and F(i+1), F(i+1) and F(i+2) since no discontinuity between them since, whereas the value of the flag is "1" represents that a discontinuity between the two frames exists. Moreover, in this embodiment, the flag "1" in the detected result 40A can be a difference information for representing the discontinuity position of the image.

Figure 7:
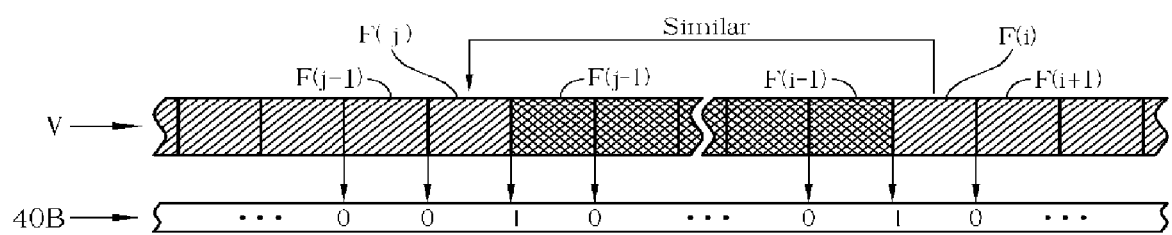

As shown in FIG. 7, the similarity comparing module 24 can be used for searching similar frames of the video signal V and store the searched results in the detected result 40B. For example, when the similarity comparing module 24 detects that the frame F(i) is similar to the frame F(j), the similarity comparing module 24 can use a corresponding flag "1" in the detected result 40B as a record to represent similarity information to show a possible inserting position of the advertising section. In other words, the similarity comparing module 24 can utilize a frame prior to a certain frame as a reference frame for determining a similarity between each reference frame and the certain frame in order to detect the repeated section.

Figure 8:
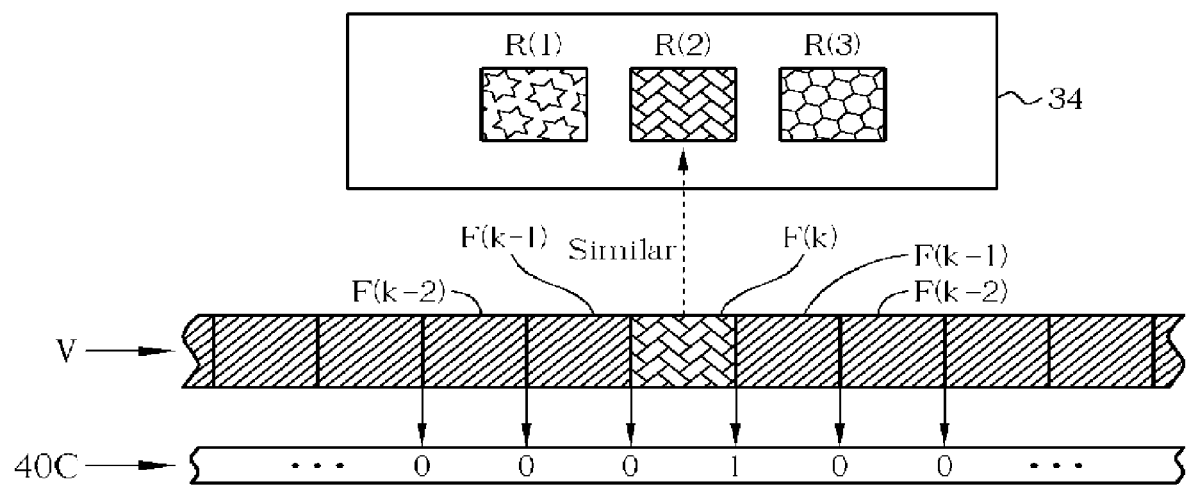

Similar to the difference comparing module 22, the similarity comparing module 24 can also utilize characteristic data corresponding to each frame to perform a comparison. If the difference between two frames is fewer than a threshold difference, this can equivalently represent that the similarity between the two frames is more than a threshold similarity. Therefore, the two frames can be regarded as being similar. Furthermore, when the similarity comparing module 24 searches a frame similar to a specific frame, it can also set a searching range according to the inserting characteristic of the advertising section. For example, when a frame F(i) is compared to find out whether another frame is similar to the frame F(i), the frames F(i-M-N) to F(i-N) can be employ as theh reference frames, and the parameters M, N can be set according to the real characteristic of the advertising section, such as the maximum and minimum of the length of advertising section and frame rate FIG. 8 is a diagram of an operation of another similarity comparing module 26. As mentioned above, a connection section having a fixed content before and after the advertising section can be a characteristic of the advertising section. When detecting the advertising section of the video signal V, the similarity comparing module 26 detects whether the connection section of the video signal V exists and generates a corresponding detected result 40C. Because the content of the connection section is fixed, the reference frame recording module 34 can pre-store the content of the connection section as the reference frame (like the reference frame R(1) to R(3) in FIG. 8). When detecting the advertising section of the video signal V, the similarity comparing module 26 can compare each frame of the video signal V with the reference frame stored by the reference frame recording module 34. Taking FIG. 8 for example, if the similarity comparing module 26 determines that the frame F(k) is similar to a pre-stored reference frame R(2) stored by the reference frame recording module 34, the similarity comparing module 26 can use a flag "1" in the detected result 40C as similarity information in order to represent that the frame F(k) is possibly the inserting position of the advertising section. Conversely, if the frame F(k−1) of the video signal V does not conform to each reference frame stored by the reference frame recording module, a corresponding flag "0" can be used.

Similar to the similarity comparing module 24, the similarity comparing module 26 can also utilize the characteristic data corresponding to each frame to perform the comparing operation. In this situation, the reference frame recording module 34 records the characteristic data corresponding to each frame, and the similarity comparing module 26 compares the characteristic data of each frame of the video signal with the characteristic data of the reference frame. In the preferred embodiment of the present invention, the characteristic data of a frame can be less than the sum of the characteristic data of all pixel information of the frame, therefore, the reference frame recording module 34 can record more reference frames and each comparing module 22, 24, and 26 can compare more efficiently. Furthermore, the reference frame of the reference frame recording module 34 can be determined and updated by users. For example, the signal processing system 20 shown in FIG. 2 can be positioned in a recording device. If users see a connection section having a fixed content or a fixed mode between the advertising section and the normal program, users can gather the frames of the connection section by utilizing the recording device and utilize the reference frame recording module 34 to store the frames as the reference frames. Therefore, in the following operation, the similarity comparing module 26 can detect the advertising section according to the above-mentioned reference frames. In the preferred embodiment of the present invention, the reference frame recording module 34 can be a non-volatile memory for continuously storing all kinds of reference frames (or corresponding characteristic data).

Figure 9:
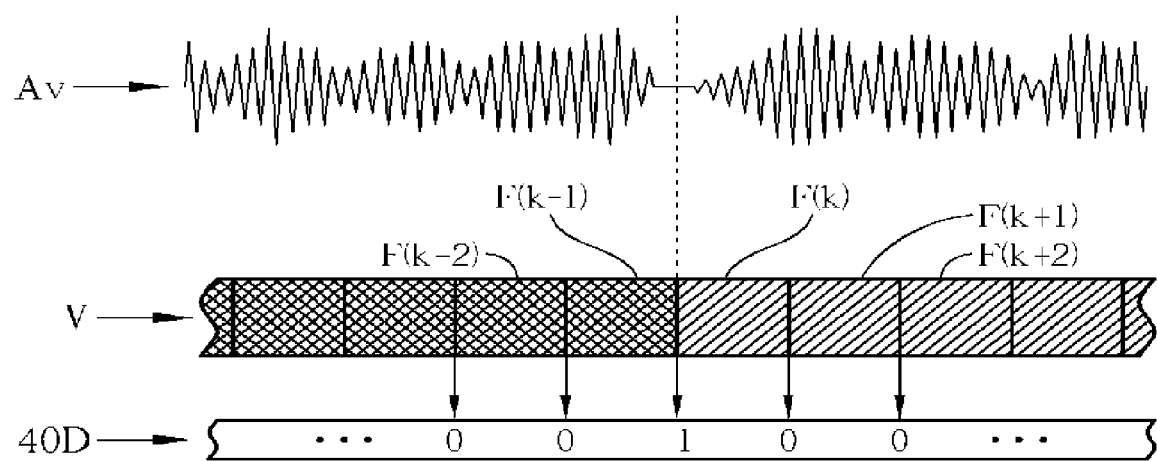

FIG. 9 is a diagram of an operation of the audio comparing module. As shown in FIG. 4 and the related description, the advertising section creates a section of the audio signal. When detecting the advertising section of the video signal V, the audio comparing module 28 can detect the above-mentioned section of the audio signal Av, which corresponds to the video signal V and generate a corresponding detected result 40D. For example, as shown in FIG. 9, if the audio comparing module 28 detects that a section of the audio signal Av between the frame F(k−1) and the frame F(k) exists, a value of flag is "1" in the detected result 40D as audio information, otherwise it is "0" in the detected result 40D.

After generating each detected results 40A to 40D, the advertising estimating module 30 shown in FIG. 5 can utilize these detected results to estimate the inserting position of the advertising section.

Figure 10:
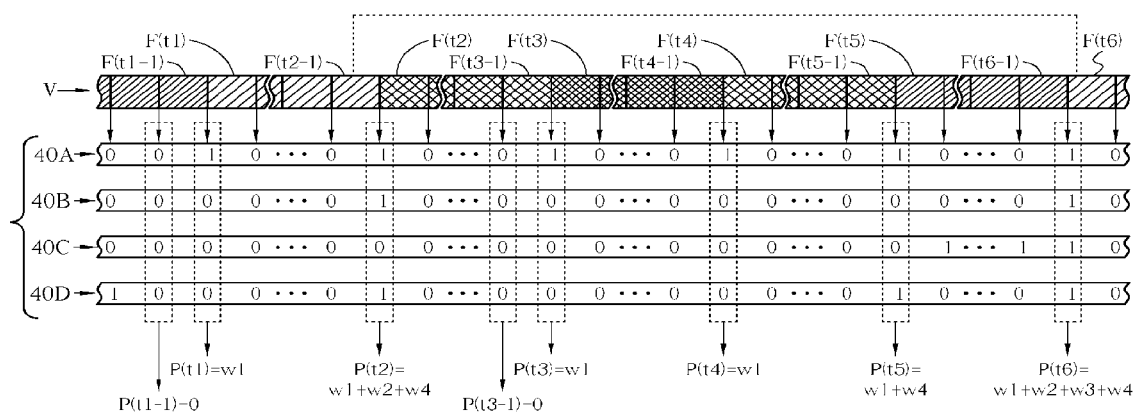
FIG. 10 is a diagram of each corresponding data signal when the advertising estimating module shown in FIG. 5 operates.

FIG. 5 also shows an advertising estimating module 30 of an embodiment according to the present invention. The advertising estimating module 30 can utilize 4 weighting modules 38A to 38D to weight each flag of the detected results 40A to 40D and integrate the weighted results into advertising information P in order to show the possibility of each frame to be the inserting position of the advertising section. FIG. 10 is a diagram of each corresponding data signal when the advertising estimating module shown in FIG. 5 operates. The weighting module 38A to 38D can respectively multiply each flag of the detected result 40A to 40D by each weighting value w1 to w4 (wherein each weighting value can be an integer), and add all weighted flags to generate the advertising information of each frame. It's noted that the weighting values can be set according to a statistical analysis of the video signal. As shown in FIG. 10, the advertising information P(t1) corresponding to the frame F(t1) is w1. This represents that although the frame F(t1) is a discontinuity of the video signal, no similar frame of the video signal V exists, the frame F(t1) does not conform to the fixed content of the connection section, and no audio section is detected. Therefore, the discontinuity of frame F(t1) might be caused by a transition of the normal program itself, not a transition between the normal program and the advertising section. Similarly, the advertising information P(t3), P(t4) corresponding to the frames F(t3), F(t4) are both w1. This also means that the frames F(t3), F(t4) are only discontinuities, and do not conform to other characteristics of the inserting position of the advertising section.

Oppositely, the frame F(t2) is not only a discontinuity (detected result 40A), but also conforms to the characteristic of the repeated section (detected result 40B) and the audio section (detected result 40D). Therefore, the corresponding advertising information P(t2) becomes w1+w2+w4, and the frame F(t2) can be the inserting position of the advertising section. Similarly, the frame F(t6) also conforms to each characteristic of FIG. 1 to FIG. 4, so the corresponding advertising information P(t6) is w1+w2+w3+w4. In other words, if the weighting values are all positive, and if a certain frame conforms to more characteristics of the advertising section, the corresponding advertising information is larger. Equivalently, advertising information corresponding to a frame often shows the possibility of the frame to be the inserting position of the advertising section. In other words, if advertising information corresponding to a frame is larger, the frame is more likely the inserting position of the advertising section. The present invention advertising estimating module 30 can determine the advertising section according to the advertising information corresponding to each frame.

Of course, the present invention advertising estimating module 30 can integrate different detected results through other algorithms instead of the algorithm in FIG. 5. For example, the present invention can find out the discontinuity of the video signal V first according to the detected result 40A, and then utilize the similarity comparing module 26 to compare the frames corresponding to the discontinuity to detect whether the frames further conform to the characteristic of the connection section. Equivalently, this can also integrate the detected results of different characteristics.

Figure 11:
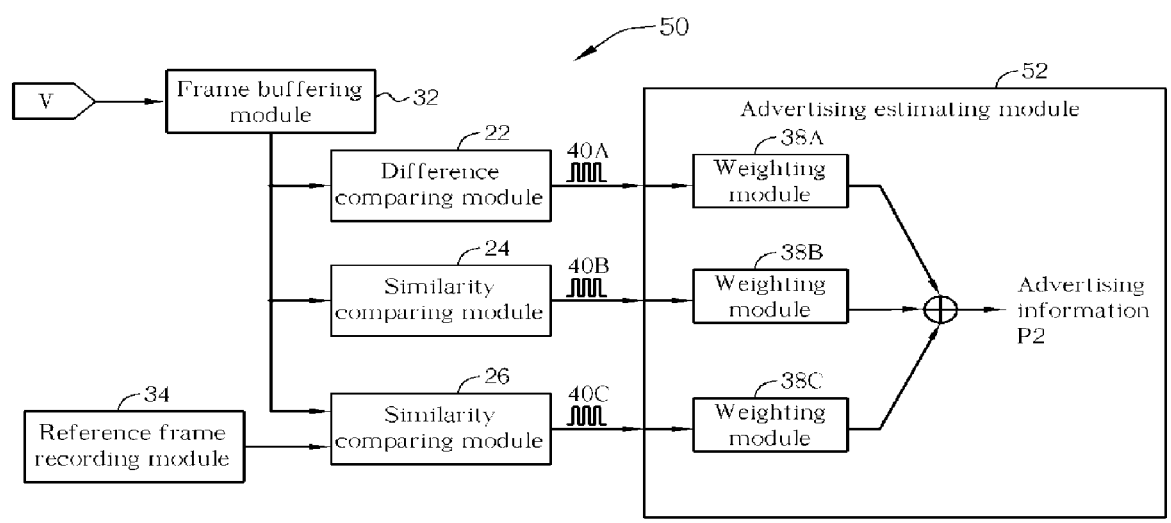
FIG. 11 is a block diagram of the signal processing system of another embodiment according to the present invention.

In the embodiment of FIG. 5, the present invention utilizes 4 comparing modules to detect 4 characteristics of the inserting position of the advertising section and integrate 4 detected results 40A to 40D generated by the 4 comparing modules in order to determine the inserting position of the advertising section. Furthermore, FIG. 11 is a diagram of the signal processing circuit of another embodiment 50 according to the present invention. In the embodiment, the signal processing circuit 50 comprises the difference comparing module 22 and the similarity comparing module 24 and 26 to detect 3 characteristics of the advertising section and generate 3 detected results 40A to 40C, and the advertising estimating module 52 in FIG. 11 integrates them to detect the advertising section (for example, utilizing the weighting modules 38A to 38C to weight the flags of each detected result and utilizing the amount of the weighted value to generate the advertising information P2).

In the embodiment in FIG. 5 and FIG. 11, the present invention signal processing system can be embodied through hardware, software, or firmware. Hence, when the present invention signal processing system is positioned in a multimedia computer, a CPU can be used to execute different software program codes to respectively achieve functions of each comparing module and the advertising estimating module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting advertising sections of a video signal, the method comprising:
    obtaining the video signal, wherein the video signal is capable of providing a plurality of frames according to a predetermined order to show a dynamic image;
    performing a difference comparing step to determine the difference between a first frame and a second frame successive to the first frame, if a difference between the first frame and the second frame is more than a threshold difference, providing a corresponding difference information for the first frame;
    performing a similarity comparing step to determine a similarity between a third frame and a fourth frame not consecutive to the third frame where a minimum number of frames separating the third and fourth frames is determined according to a minimum length of the advertising sections and frame rate, if the similarity between the third frame and the fourth frame is more than a threshold similarity, providing a corresponding similarity information for the third frame; and
    performing an advertising estimating step to determine which frames of the video signal belong to the advertising sections according to the difference information and the similarity information.

2. The method of claim 1, wherein the fourth frame is a frame prior to the third frame in the similarity comparing step.

3. The method of claim 1, wherein when the video signal provides different audio signals at different timings, the method further comprises:
    performing an audio comparing step to compare different audio signals of the video signal, to locate a section of the audio signal, and to provide corresponding audio section information; and determining which frames of the video signal belong to the advertising sections according to the difference information, the similarity information, and the audio section information in the advertising estimating step.

4. The method of claim 1, wherein the advertising estimating step of determining which frames belong to the advertising sections according to the similarity information determines the frames of the advertising sections are between the fourth frame and the frame corresponding to the similarity information.

5. The method of claim 1, wherein the advertising estimating step of determining which frames belong to the advertising sections according to the similarity information determines the frames of the advertising sections are prior to a frame corresponding to the similarity information.

6. The method of claim 1, wherein the advertising estimating step of determining which frames belong to the advertising sections according to the difference information determines frames of advertising sections are between two frames corresponding to the difference information.

7. The method of claim 1, wherein the advertising estimating step of determining which frames belong to the advertising sections according to the similarity and the difference information determines frames of advertising sections are between the fourth frame and a frame corresponding to the similarity information and between two frames corresponding to the difference information.

8. The method of claim 1, wherein the advertising estimating step provides corresponding advertising information according to each similarity information and each difference information to make each advertising information have a corresponding advertising possibility value, wherein if a frame corresponding to the similarity information is the same as a frame corresponding to the difference information, the advertising information corresponding to the difference information has the larger advertising possibility value.

9. The method of claim 8, wherein the advertising estimating step further comprises:
comparing the advertising possibility value corresponding to each advertising information;
determining the advertising possibility information having the larger advertising possibility value and the frames of advertising sections between frames corresponding to the advertising information.

10. A signal processing system capable of detecting advertising sections of a video signal, the signal processing system comprising:
a frame buffer for temporarily storing the video signal, wherein the video signal is capable of providing a plurality of different frames to show a dynamic image according to a predetermined order;
a difference comparing module for determining a difference between a first frame and a second frame successive to the first frame, wherein if a difference between the first frame and the second frame is more than a threshold difference, the difference comparing module provides corresponding difference information for the first frame;
a similarity comparing module for determining a similarity between a third flame and a fourth flame not consecutive to the third flame where a minimum number of frames separating the third and fourth frames is determined according to a minimum length of the advertising sections and flame rate, wherein if a similarity between the third flame and the fourth flame is more than a threshold similarity, the similarity comparing module is capable of providing corresponding similarity information for the third frame; and
an advertising estimating module for determining which frames of the video signal belong to the advertising sections according to the difference information and the similarity information.

11. The signal processing system of claim 10, wherein the similarity comparing module utilizes a frame prior to the third frame as the fourth frame.

12. The signal processing system of claim 10, wherein if the video signal provides different audio signals at different timings, the signal processing module further comprises:
an audio buffering module for temporarily storing the audio signals of the video signal; and
an audio comprising module for comparing the audio signals at different timings to locate the sections of the audio signals and provide corresponding audio section information to determine which frames of the video signal belong to the advertising sections.

13. The signal processing system of claim 10, wherein when the advertising estimating module determines the frames of the advertising sections according to the similarity information, the advertising estimating module determines the frames of advertising sections are between the fourth frame and the frame corresponding to the similarity information.

14. The signal processing system of claim 10, wherein when the advertising estimating module determines the frames of the advertising sections according to the similarity information, the advertising estimating module determines the frames of the advertising sections are prior to the frame corresponding to the similarity information.

15. The signal processing system of claim 10, wherein when the advertising estimating module determines the frames of the advertising sections according to the difference information, the advertising estimating module determines the frames of the advertising sections are between two frames corresponding to the difference information.

16. The signal processing system of claim 10, wherein when the advertising estimating module determines the frames of the advertising sections according to the similarity information and the difference information, the advertising estimating module determines the frames of the advertising sections are between the fourth frame and the frame corresponding to the similarity information and between two frames corresponding to the difference information.

17. The signal processing system of claim 10, wherein the advertising estimating module provides corresponding advertising information according to each similarity information and each difference information to make each advertising information have a corresponding advertising possibility value, wherein if a frame corresponding to the similarity information is the same as a frame corresponding to the difference information, the advertising estimating module is capable of making the advertising information corresponding to the difference information have the larger advertising possibility value.

18. The signal processing system of claim 17, wherein the advertising estimating module is capable of comparing the advertising possibility values corresponding to each advertising information to determine advertising information having the larger advertising possibility value, and determining the frames of the advertising sections between frames corresponding to the advertising information.

19. The method of claim 1, wherein the advertising estimating step further comprising:

multiplying each of the difference information and the similarity information corresponding to the same frame by a weighting value respectively; and adding all weighted difference information and weighted similarity information to generate the advertising information of each frame.

20. The signal processing system of claim 10, wherein the advertising estimating module further comprising:

a plurality of weighting modules for multiplying each of the difference information and the similarity information corresponding to the same frame by a weighting value respectively, and adding all weighted difference information and weighted similarity information to generate the advertising information of each frame.

* * * * *